(12) United States Patent
Hinnegan

(10) Patent No.: US 9,826,496 B2
(45) Date of Patent: Nov. 21, 2017

(54) NAVIGATION SYSTEM WITH LOCATION MECHANISM AND METHOD OF OPERATION THEREOF

(71) Applicant: Telenav, Inc., Sunnyvale, CA (US)

(72) Inventor: John Hinnegan, Santa Monica, CA (US)

(73) Assignee: Telenav, Inc., Santa Clara, CA (US)

( * ) Notice: Subject to any disclaimer, the term of this patent is extended or adjusted under 35 U.S.C. 154(b) by 269 days.

(21) Appl. No.: 14/329,078

(22) Filed: Jul. 11, 2014

(65) Prior Publication Data

US 2016/0010997 A1    Jan. 14, 2016

(51) Int. Cl.
| | |
|---|---|
| *G06F 17/30* | (2006.01) |
| *H04L 29/06* | (2006.01) |
| *H04L 29/08* | (2006.01) |
| *H04W 64/00* | (2009.01) |
| *H04W 4/00* | (2009.01) |
| *H04W 4/02* | (2009.01) |
| *H04W 80/04* | (2009.01) |
| *G01C 21/16* | (2006.01) |

(52) U.S. Cl.
CPC ........... *H04W 64/00* (2013.01); *H04W 4/001* (2013.01); *H04W 4/021* (2013.01); *G01C 21/16* (2013.01); *G06F 17/30241* (2013.01); *H04L 67/02* (2013.01); *H04L 67/06* (2013.01); *H04L 67/18* (2013.01); *H04W 80/04* (2013.01)

(58) Field of Classification Search
CPC ....... G01C 21/00; G01C 21/362; H04W 4/02; H04W 64/00; H04W 4/023; H04W 4/021; H04W 4/028; H04W 4/025; H04W 64/003; H04W 80/04; G06F 17/30241; G06F 17/3087

See application file for complete search history.

(56) References Cited

U.S. PATENT DOCUMENTS

| | | | |
|---|---|---|---|
| 6,236,365 B1 * | 5/2001 | LeBlanc | G01C 21/206 342/450 |
| 7,100,204 B1 | 8/2006 | Myllymaki et al. | |
| 7,738,456 B2 | 6/2010 | Toebes et al. | |
| 7,752,210 B2 | 7/2010 | Riise et al. | |
| 7,937,336 B1 * | 5/2011 | Maynard-Zhang | H04L 29/1299 706/12 |
| 8,028,090 B2 | 9/2011 | Richardson et al. | |
| 8,335,637 B2 * | 12/2012 | Deurwaarder | G01C 21/34 340/905 |
| 8,374,634 B2 | 2/2013 | Dankar et al. | |
| 8,385,964 B2 | 2/2013 | Haney | |
| 8,520,695 B1 * | 8/2013 | Rubin | G08G 9/02 370/337 |
| 8,724,522 B2 * | 5/2014 | Livingood | H04L 41/12 342/357.4 |
| 9,241,044 B2 * | 1/2016 | Shribman et al. | |
| 2002/0055924 A1 * | 5/2002 | Liming | G01S 5/0027 |

(Continued)

*Primary Examiner* — Thomas G Black
*Assistant Examiner* — Demetra Smith-Stewart
(74) *Attorney, Agent, or Firm* — IP Investment Law Group

(57) ABSTRACT

A method of operation of a navigation system includes: identifying a location message including an internet address and a message portion; and generating with a control unit a geographic profile associated with the internet address based on the message portion for locating a device based on the internet address.

19 Claims, 6 Drawing Sheets

(56) References Cited

U.S. PATENT DOCUMENTS

| | | | |
|---|---|---|---|
| 2005/0018645 A1* | 1/2005 | Mustonen | H04L 12/24 370/349 |
| 2006/0178140 A1* | 8/2006 | Smith | H04M 3/42348 455/427 |
| 2008/0262715 A1* | 10/2008 | Geelen | G01C 21/3655 701/533 |
| 2010/0167760 A1* | 7/2010 | Kim | H04W 4/02 455/456.3 |
| 2013/0007256 A1 | 1/2013 | Prieditis | |
| 2013/0246452 A1* | 9/2013 | Vadrevu | G06F 17/30867 707/769 |
| 2015/0201305 A1* | 7/2015 | Edge | H04W 4/021 455/456.3 |

\* cited by examiner

NAVIGATION SYSTEM WITH LOCATION MECHANISM AND METHOD OF OPERATION THEREOF

TECHNICAL FIELD

An embodiment of the present invention relates generally to a navigation system, and more particularly to a system with a location mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding locating the device. The possible applications for locating the device have yet been fully utilized.

Thus, a need still remains for a navigation system with a location mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a location message including an internet address and a message portion; and generating with a control unit a geographic profile associated with the internet address based on the message portion for locating a device based on the internet address.

An embodiment of the present invention provides a navigation system, including: a communication unit for communicating a location message; a control unit, coupled to the communication unit, for: identifying a location message including an internet address and a message portion, and generating a geographic profile associated with the internet address based on the message portion for locating a device based on the internet address.

An embodiment of the present invention provides a non-transitory computer readable medium including instructions for a navigation system, including: identifying a location message including an internet address and a message portion; and generating with a control unit a geographic profile associated with the internet address based on the message portion for locating a device based on the internet address.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
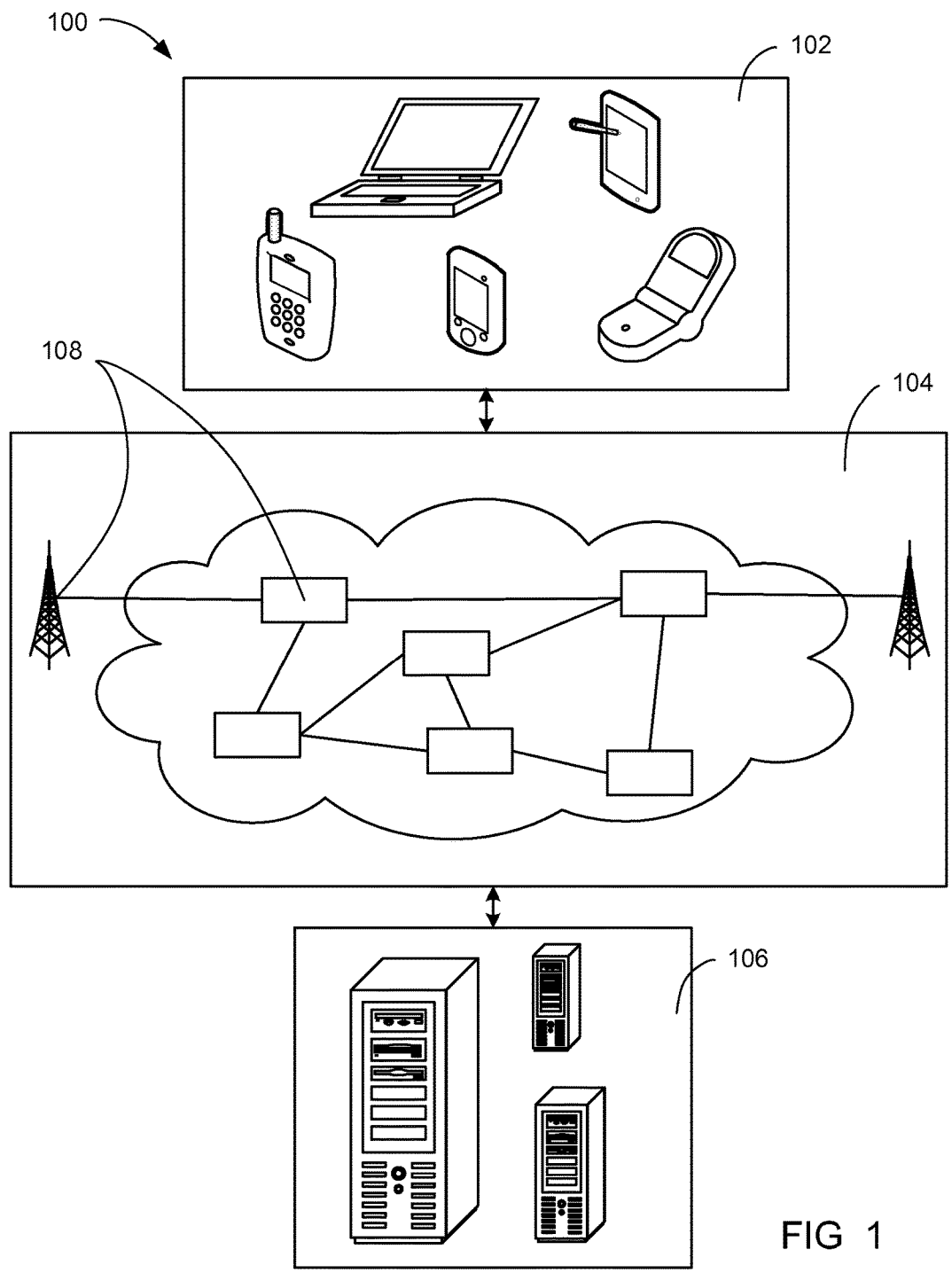
FIG. 1 is a navigation system with a location mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with a command mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The network 104 can include one or more instances of a communication portal 108. The communication portal 108 can include a device for interfacing with the first device 102 for accessing the network 104. For example, the communication portal 108 can include a router, a repeater, a base station, a gateway, a server, or a combination thereof. The first device 102 can interface with the communication portal 108 for utilizing the network 104 to communicate with the second device 106.

For illustrative purposes, the navigation system 100 will be described as communicating messages from the first device 102 to the second device 106 using one or more instances of the communication portal 108 in the network 104, and with the second device 106 communicating back to the first device 102 in response thereto. However, it is understood that the devices can communicate in any order.

Figure 2:
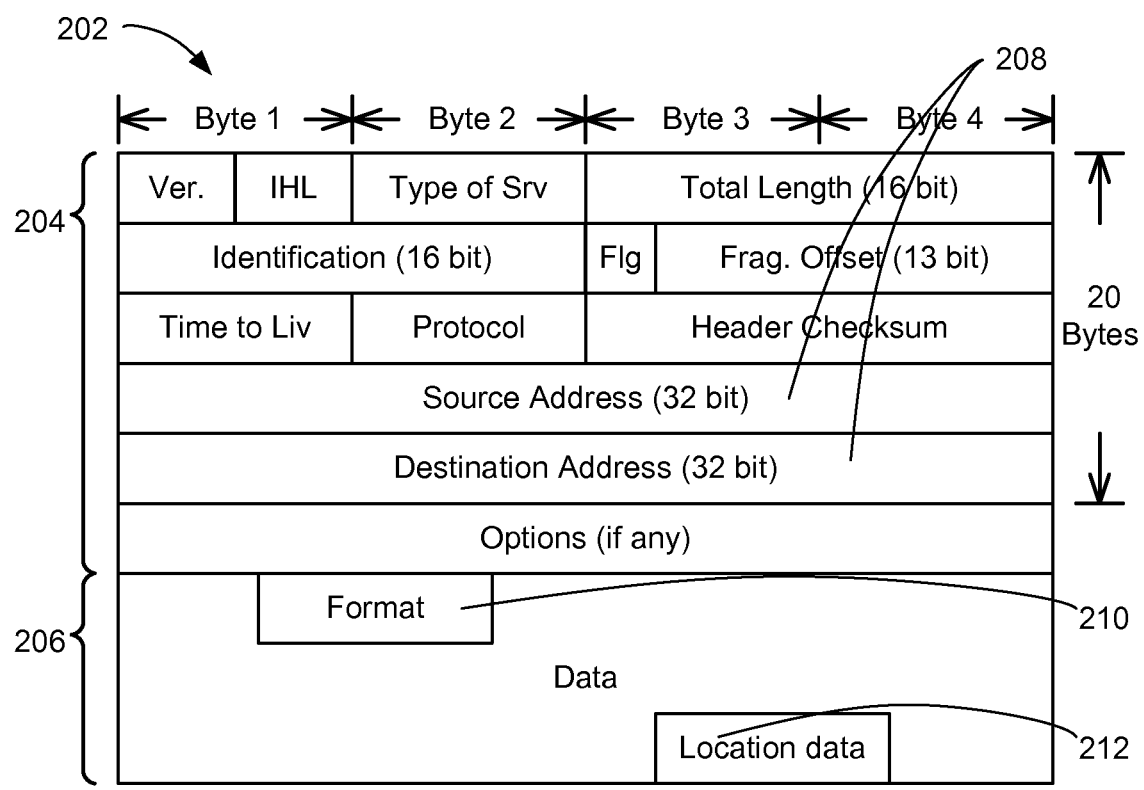
FIG. 2 is an example of a packet for communicating with the navigation system of FIG. 1.

Referring now to FIG. 2, therein is shown an example of a packet 202 for communicating with the navigation system 100 of FIG. 1. The packet 202 can be a unit or a grouping of information used for communicating between devices within the navigation system 100. The navigation system 100 can use one or more instances of the packet 202 to communicate intended content between devices.

The packet 202 can be arranged or organized according to a protocol or a format for the communication. The packet 202 can include specific content, order of the content, or a combination thereof for the information.

For example, the packet 202 can include a header portion 204, a message portion 206, or a combination thereof. The header portion 204 can be one or more segments for addressing the intended content. The header portion 204 can include information regarding version information, header length, type of service, total length, identification, flags, fragment offset, time to live, protocol or format, header checksum, source address, destination address, options, or a combination thereof.

The header portion 204 can include an internet address 208. The internet address 208 is a label assigned to each device participating in a computer network. The internet address 208 can be based on Internet Protocol (IP). The internet address 208 can include Internet Protocol address. For example, the internet address 208 can include a website address, an IP address, or a combination thereof for identifying or representing the first device 102 of FIG. 1, the second device 106 of FIG. 1, the communication portal 108 of FIG. 1, or a combination thereof.

The navigation system 100 can use the internet address 208 to identify a device, such as the first device 102, sending the packet 202. The navigation system 100 can further use the internet address 208 independent of other identification information, such as device identification or a phone number, to identify the transmitting device.

The packet 202 can include other information. For example, the packet 202 can include the version information and the header length in the first byte. The type of service can be represented in a byte. The type of service can be after the first byte. The information representing total length can be represented by two bytes, after the first byte, the type of service, or a combination thereof. Similarly, the identification information can be represented by two bytes, the flag and the fragment offset together can be represented by two bytes, the time to live and the protocol information can each be represented by a byte, or a combination thereof.

The header checksum can be represented by two bytes, and the source address, the destination address, the option, or a combination thereof can be represented by four bytes. The source address, the destination address, or a combination thereof can be the internet address 208.

The message portion 206 can be one or more segments within the packet 202. The message portion 206 can include the one or more segments a message format 210. The message format 210 is an arrangement, design, organization, or a combination thereof for information used within a device. The message format 210 can be for processing at the device indicated by the destination address of the header portion 204.

The message format 210 can include a destination or a use within the designated device, such as the first device 102, the second device 106, or a combination thereof. The message format 210 can describe or require type of information, an order or sequence for the information, or a combination thereof. The navigation system 100 can use the message format 210 identify specific types of information.

The message portion 206 can further include a location data 212. The location data 212 is information regarding a geographic location of the sourcing device. For example, the location data 212 can be the geographic location of the user's device. As a more specific example, the location data 212 can include an address, a coordinate, a cross street, a building name, an abstract label or name for a location, or a combination thereof corresponding to a current location of the first device 102.

The navigation system 100 can identify, recognize, access, process, or a combination thereof for the location data 212 in the message portion 206 based on the message format 210. Details regarding the use and processing of the location data 212 and the internet address 208 will be described below.

Figure 3:
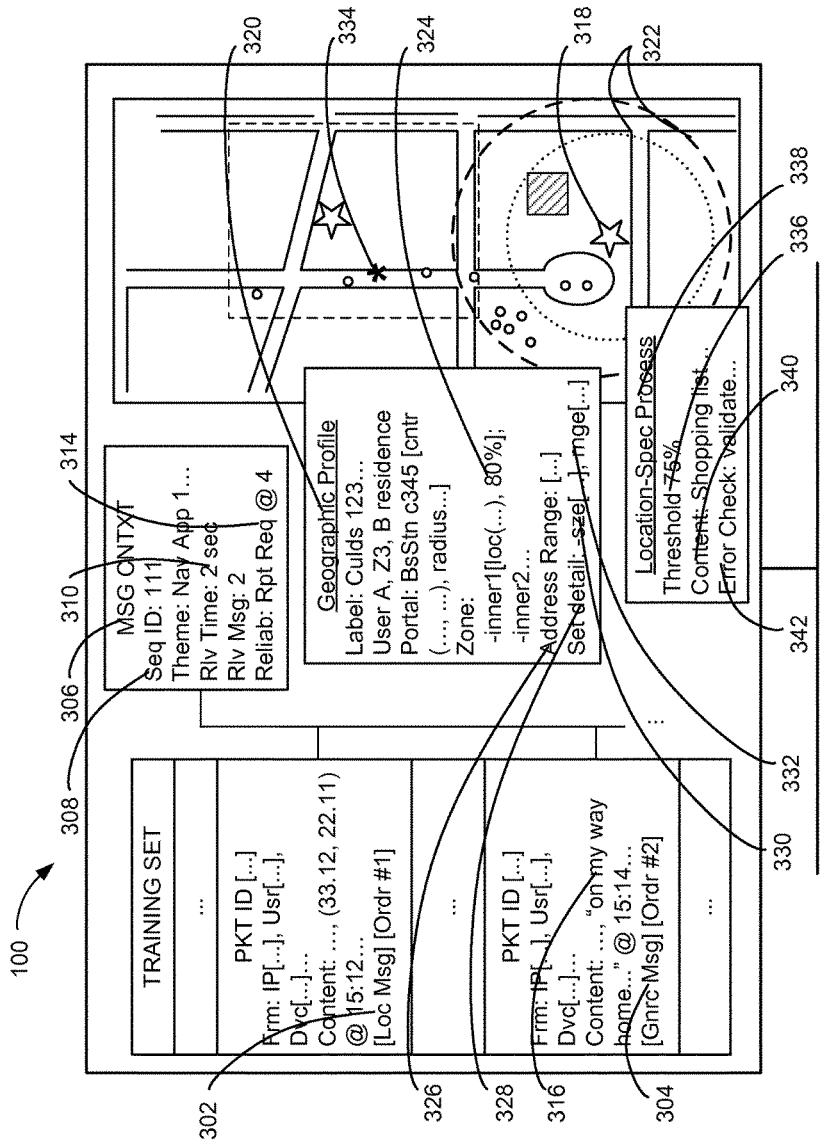
FIG. 3 is an example of a display interface of the second device of FIG. 1.

Referring now to FIG. 3, therein is shown an example of a display interface of the second device 106 of FIG. 1. The navigation system 100 can use one or more instances of the packet 202 of FIG. 2 for locating the user. For example, the navigation system 100 can identify the packet 202 as a location message 302, a generic message 304, or combination thereof.

The location message 302 is information communicated between devices including indication of a geographic location for a sourcing device. The location message 302 can include the packet 202 further including the location data 212 of FIG. 2, contextual content in the message portion 206 of FIG. 2 indicating geographic location, or a combination thereof for a user device, including the first device 102 of FIG. 1. The navigation system 100 can identify the location message 302 based on processing the message portion 206 of the packet 202.

The location message 302 can include the header portion 204 of FIG. 2. The navigation system 100 can further use the location message 302 as a training set or an input set of data for locating the user using the header portion 204. The navigation system 100 can process the internet address 208 of FIG. 2 and the message portion 206 of the location message 302 for using the internet address 208 to locate the first device 102.

The generic message 304 is information communicated between devices without any indication of the sourcing device. The generic message 304 can include the packet 202 without the location data 212 or any contextual data associated with the geographic location of the sourcing device. The navigation system 100 can use the internet address 208 of the generic message 304 to locate the sourcing device. The navigation system 100 can use the internet address 208 of the generic message 304 to locate the first device 102 based on processing the location message 302 previously communicated with the first device 102.

The navigation system 100 can utilize message context 306 associated with the packet 202 to process the location message 302, the generic message 304, or a combination thereof. The message context 306 is a representation of a situation, an environment, a purpose, a significance, or a combination thereof regarding communicated information.

The message context 306 can include representations regarding a sequence, a grouping, a connection, an association, or a combination thereof for multiple instances of the packet 202. The message context 306 can further include representations regarding the situation, the environment, the purpose, the significance, or a combination thereof associated with the message portion 206 or data therein.

For example, the message context 306 can include a relevant sequence 308. The relevant sequence 308 is a grouping of or a connection between multiple instances of the packet 202. The relevant sequence 308 can be represented as an identification or a categorization for instances of the packet 202 having similarities or associations with each other. The relevant sequence 308 can include a grouping or a sequence of instances of the packet 202, including the location message 302, the generic message 304, or a combination thereof, for communicating a block of data, data for an application or a function therein, or a combination thereof.

As a more specific example, the message context 306 can include a grouping or a sequence of instances of the packet 202 for communicating large or continuing amounts of data, such as a movie, streaming content, live communication content including chat thread or Voice over Internet Protocol (VoIP), or a combination thereof. Also as a more specific example, the message context 306 can include instances of the packet 202 corresponding to the message portion 206 for executing a feature, relating to a same context or title, such as an email thread or a patterned behavior, or a combination thereof.

The relevant sequence 308 can be based on a relevant time 310, a relevant message, or a combination thereof. The relevant time 310 can be a duration of time for recognizing temporal association between instances of the packet 202.

The relevant time 310 can include a period of time for marking based on an initial independent instance of the packet 202 having a unique or unrelated context in comparison to preceding instances of the packet 202. The relevant time 310 can include a period of time based on last-received instances of the packet 202 associated with a unique or a recognized context. The navigation system 100 can use the relevant time 310 as a threshold for processing the relevant sequence 308.

The relevant message is the instance of the packet 202 associated or connected to an analyzed instance of the packet 202. The relevant message can be an instance of the packet 202 preceding the instance of the packet 202 under analysis or consideration.

The navigation system 100 can analyze or process an instance of the packet 202 and compare the analyzed instance to preceding instances of the packet 202. The navigation system 100 can determine one or more preceding instances of the packet 202 associated or connected to the analyzed instance of the packet 202 as the relevant message. The navigation system 100 can determine the relevant message based on the relevant time 310, context, or a combination thereof.

Also for example, the message context 306 can include a reliability status 314. The reliability status 314 is an indication of validity associated with the packet 202 under analysis, the packet 202 associated with the relevant sequence 308, or a combination thereof. The reliability status 314 can include an error report, a repeat request, a deviation from the route, or a combination thereof. The reliability status 314 can be based on a preceding communication. The navigation system 100 can use the reliability status 314 to determine an accuracy or validity associated with the packet 202 or a process associated therewith.

Also for example, the message context 306 can include contextual input 316. The contextual input 316 is situational or environmental information indicated in the message portion 206. The contextual input 316 can represent the contextual data. The navigation system 100 can use the contextual input 316 to determine an abstract context associated with the packet 202. The abstract context can include a representation of a situation, an environment, a purpose, a significance, or a combination thereof regarding the user communicating through the packet 202.

The context can be represented using an identification, a categorical value, a set of parameters, a machine-learning cluster or model, or a combination thereof for representing the situation, the environment, the purpose, the significance, or a combination thereof. The context can be an abstraction of a value or a reason for the user regarding the packet 202.

The contextual input 316 can include various types of information. For example, can include content of a communication, such as an email or a text message, schedule information, including calendar events or meeting details, locational labels, such as "home" or "work", address books, settings, profiles, or a combination thereof. The contextual input 316 can be determined based on keywords, patterns, thresholds, formats, or a combination thereof predetermined by the navigation system 100.

The navigation system 100 can further process a portal location 318. The portal location 318 can include information regarding geographic location of the communication portal 108 of FIG. 1. The portal location 318 can include location information, such as coordinates or address, for cell sites, routers, gateway, or a combination thereof. The portal location 318 can be information predetermined by the navigation system 100, accessed or determined based on externally available data, estimated by the navigation system 100, or a combination thereof.

The navigation system 100 can generate a geographic profile 320 corresponding to the internet address 208. The geographic profile 320 is a description of a relationship between a geographic location and the internet address 208. The geographic profile 320 can describe a geographic location of a device represented by a particular instance of the internet address 208. The geographic profile 320 can further describe a likelihood or a measure of accuracy for describing the geographic location of a device based on the internet address 208.

The geographic profile 320 can include various information, such as a coverage zone 322, a confidence level 324, an address range 326, a set detail 328, or a combination thereof. The coverage zone 322 is a geographic location or area corresponding to a specific instance of the internet address 208.

The coverage zone 322 can correspond to the communication portal 108 assigning or utilizing the internet address 208 for communicating with the first device 102. The coverage zone 322 can represent a physical location or area covered by the communication portal 108 assigning the specific instance of the internet address 208. For example, the coverage zone 322 can correspond to a cell site, a range for a wireless router, a broadcast range for a communication tower, or a combination thereof.

The coverage zone 322 can be represented as a distance and a reference point, a specific shape or boundary on a map, a collection of locations or coordinates, or a combination thereof. The coverage zone 322 can be generated based on associating the internet address 208 with the location data 212, the contextual input 316, or a combination thereof in the location message 302. The coverage zone 322 can be specific to a user, a device, an instance of the context, a service provider or a combination thereof.

For example, the size or location of the coverage zone 322 can be different based on access privileges or membership status to a specific instance of the communication portal 108. Also for example, the coverage zone 322 can have different shapes based on weather, number of simultaneous users, type of service or data, type of communication mode, or a combination thereof.

The confidence level 324 is a measure of accuracy or reliability associated with describing the geographic location of a device based on the internet address 208. The confidence level 324 can be associated with a specific instance of the coverage zone 322. The confidence level 324 can correspond specifically to an instance of the coverage zone 322 to include a value representing a likelihood of a device, such as the first device 102 or the communication portal 108, being within the coverage zone 322.

The geographic profile 320 can include the coverage zone 322 and the confidence level 324 as a function, a process, an equation, or a combination thereof. For example, a distance, a reference location, or a combination thereof can be input values for calculating the confidence level 324. The geographic profile 320 can further include multiple instances of the coverage zone 322 and corresponding unique instances of the confidence level 324.

The address range 326 is a relationship between multiple instances of the internet address 208 corresponding to a given area. The address range 326 can include a set or a collection of multiple instances of the internet address 208 available for a given instance of the coverage zone 322 or a specific geographic area.

The address range 326 can represent a set or a collection of possible values of the internet address 208 assignable to a device for a given instance of the communication portal 108. For example, the address range 326 can include frequently used or total available range of dynamic IP addresses for the communication portal 108, a service provider, the first device 102, or a combination thereof.

The address range 326 can be based on multiple instance of the geographic profile 320 for different instances of the internet address 208 overlapping a common geographic region for the corresponding instances of the coverage zone 322. The address range 326 can be represented in a variety of ways. For example, the address range 326 can be represented with a table or a collection of internet addresses associated with the coverage zone 322, a link or a pointer linking instances of the geographic profile 320 based on overlapping instances of the coverage zone 322, or a combination thereof.

The set detail 328 is statistical information regarding available data contributing to generating the geographic profile 320. The set detail 328 can represent a size, a quality, a magnitude, or a combination thereof for use in generating a specific instance of the geographic profile 320. The set detail 328 can include various information, such as a sample size 330, a sample range 332, or a combination thereof.

The sample size 330 can include a number of previous instances of the location message 302 corresponding to the coverage zone 322, common instance of the location data 212, or a combination thereof. The sample range 332 is a representation of diversity among the location data 212 for the instances of the location message 302 corresponding to the coverage zone 322, common instance of the location data 212, or a combination thereof.

The navigation system 100 can calculate a location estimate 334. The location estimate 334 can include one or more instances of location coordinates calculated by the navigation system 100 to represent a geographical location of a device. The location estimate 334 can be based on the geographic profile 320. For example, the location estimate 334 can include an instance of the coverage zone 322 with a satisfactory instance of the of the confidence level 324 for a relevant instance of the internet address 208. Also for example, the location estimate 334 can include one or more specific set of coordinates within the coverage zone 322 based on the message context 306.

The navigation system 100 can use the geographic profile 320 based on a profile threshold 336 for a location-specific process 338. The profile threshold 336 is one value or a set of values for validating the geographic profile 320. The profile threshold 336 can be for validating the confidence level 324 of the coverage zone 322. The profile threshold 336 can further be for initiating processes utilizing the geographic profile 320 as described by the location-specific process 338.

The location-specific process 338 can include processing mechanisms utilizing a validated instance of the geographic profile 320 corresponding to the internet address 208. For example, the location-specific process 338 can include a location-specific content 340, a location error-check mechanism 342, or a combination thereof.

The location-specific content 340 is information intended for responding to the device corresponding to the internet address 208. The navigation system 100 can receive the location message 302 or the generic message 304, calculate the location estimate 334 for the first device 102 sending the message based on the internet address 208 in the communicated message, and respond with the location-specific content 340 relevant to or associated with the location estimate 334.

The location-specific content 340 can include data in the message portion 206 for communicating to the user through the first device 102. For example, the location-specific content 340 can include advertisement content for a service or an establishment within a threshold distance from the location estimate 334.

Also for example, the location-specific content 340 can include a reminder, a message from a third party, or a combination thereof associated with or relevant to the location estimate 334. As a specific example, the location-specific content 340 can include a shopping list communicated near or at a store or a clue communicated near a check point for a game.

The location error-check mechanism 342 is a process or a method for validating the message portion 206 of the location message 302 with the geographic profile 320. The location error-check mechanism 342 can be used to validate the location data 212, the contextual input 316, or a combination thereof.

Figure 4:
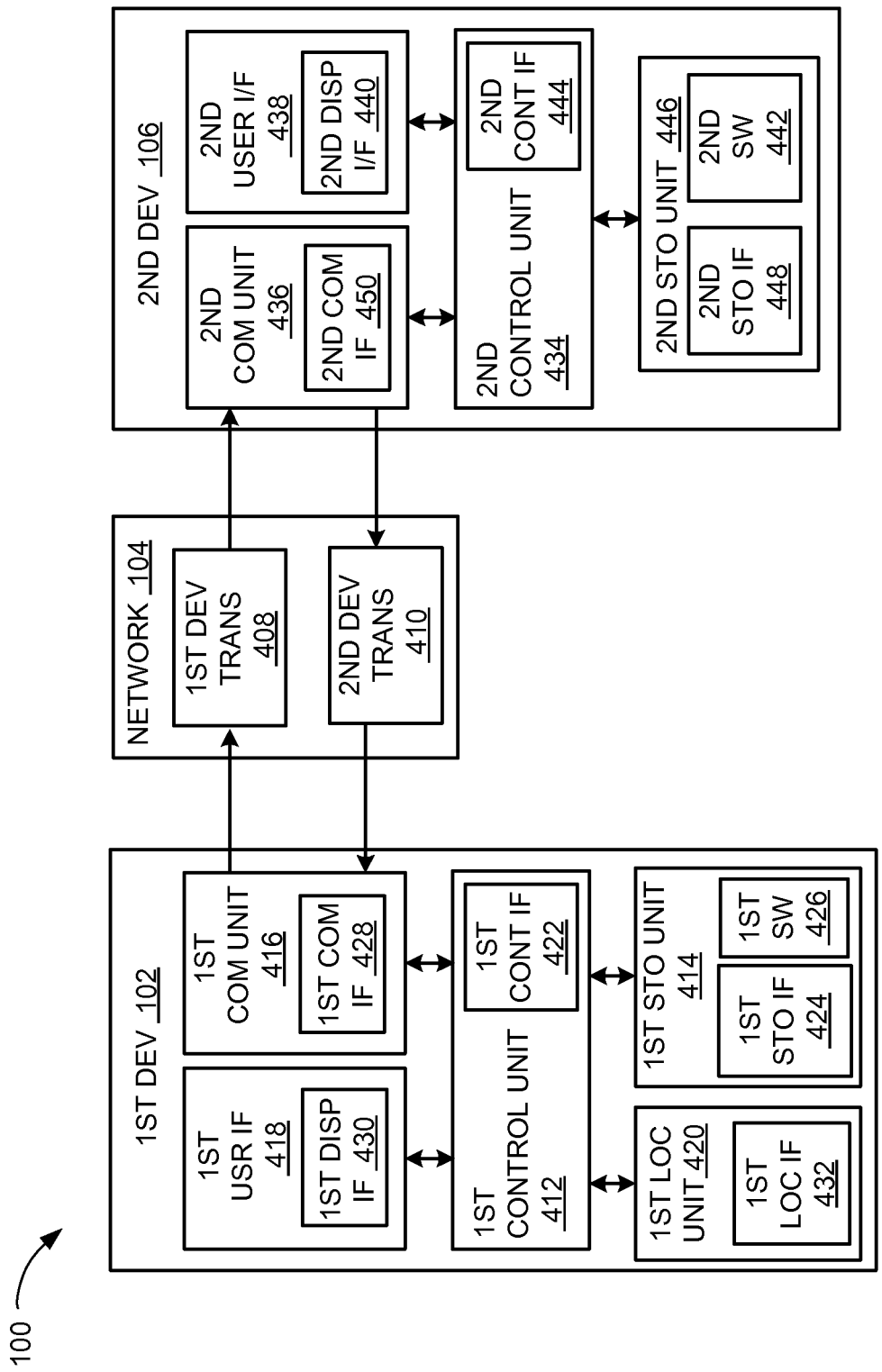
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a first location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the first location unit 420. The first control unit 412 can further execute the first software 426 for interaction with the network 104 via the first communication unit 416.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 420 can include a first location interface 432. The first location interface 432 can be used for communication between the first location unit 420 and other functional units in the first device 102. The first location interface 432 can also be used for communication external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The navigation system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units.

The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
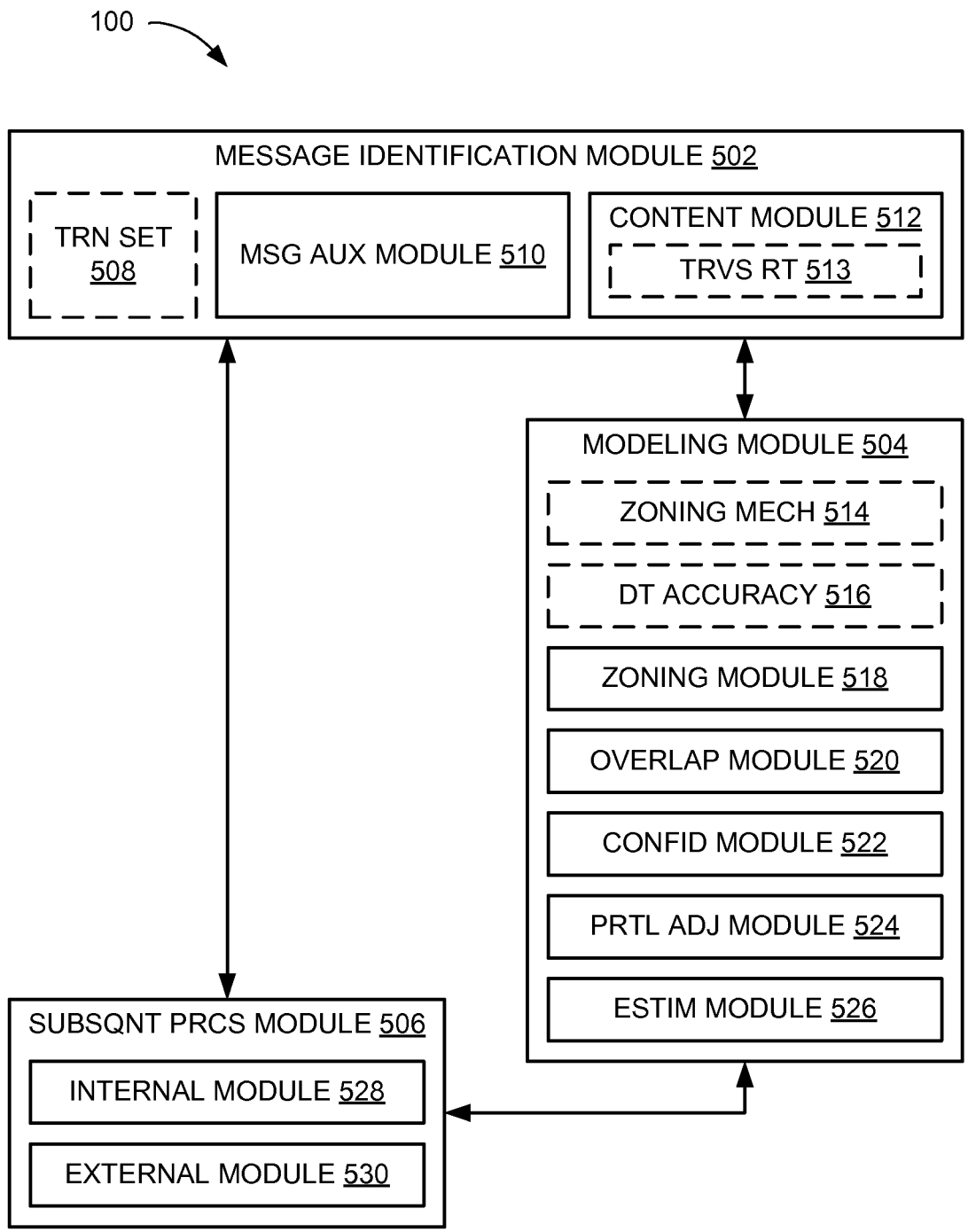
FIG. 5 is a control flow of the navigation system.

Referring now to FIG. 5, therein is shown a control flow of the navigation system 100. The navigation system 100 can include a message identification module 502, a modeling module 504, a subsequent processing module 506, or a combination thereof.

The message identification module 502 can be coupled to the modeling module 504, the subsequent processing module 506, or a combination thereof using wired or wireless connections, by having an output of one module as an input of the other module, by having operations of one module influence operation of the other module, or a combination thereof. Similarly, the modeling module 504 can be coupled to the subsequent processing module 506. The modules can be directly coupled with no intervening structures or objects other than the connector there-between or indirectly coupled.

The message identification module 502 is for communicating and identifying the packet 202 of FIG. 3. The message identification module 502 can communicate the packet 202 by using the first communication unit 416 of FIG. 4, the second communication unit 436 of FIG. 4, or a combination thereof to receive or transmit the packet 202.

The message identification module 502 can communicate the packet 202 including or identified by the internet address 208 of FIG. 2 for the transmitting device in the header portion 204 of FIG. 2 in the packet 202, including the first device 102 of FIG. 1. The message identification module 502 can receive the packet 202 including the internet address 208 independent of information in or content of the message portion 206 of FIG. 2, including geographic information therein.

For example, the message identification module 502 can receive the location message 302 of FIG. 3 including the location data 212 of FIG. 2, the contextual input 316 of FIG. 3 regarding geographic location, or a combination thereof in the message portion 206 of the packet 202. Also for example, the message identification module 502 can receive the generic message 304 of FIG. 3 with or without the location data 212, the contextual input 316 regarding geographic location, or a combination thereof in the message portion 206 of the packet 202.

Also for example, the message identification module 502 can communicate the packet 202 corresponding to the internet address 208. The message identification module 502 can receive the location message 302, the generic message 304, or a combination thereof corresponding to the internet address 208 in the header portion 204 of the packet 202.

The message identification module 502 can further process information describing and detailing the packet 202. The message identification module 502 can identify a training set 508. The training set 508 can include a grouping of data used for analyzing to generate a desired output. The training set 508 can include the grouping data for serving as an input to a process for generating the desired output.

The message identification module 502 can identify one or more instances of the location message 302, the generic message 304, or a combination thereof as the training set 508. The message identification module 502 can use a message auxiliary module 510, a content module 512, or a combination thereof to identify the training set 508.

The message auxiliary module 510 is for processing information describing and detailing the packet 202. The message auxiliary module 510 can determine and utilize the message context 306 of FIG. 3 for processing information describing and detailing the packet 202.

For example, the message auxiliary module 510 can identify the relevant sequence 308 of FIG. 3 for multiple instances of the packet 202, such as for the generic message 304, the location message 302, or a combination thereof. Also for example, the message auxiliary module 510 can determine the reliability status 314 of FIG. 3 for the relevant sequence 308.

The message auxiliary module 510 can identify the relevant sequence 308 including an association or a connection between multiple instances of the packet 202 in a variety of ways. For example, the message auxiliary module 510 can identify the relevant sequence 308 based on similarities, such as common value or sequential value, in the header portion 204 between the multiple instances of the packet 202, such as for time to live, protocol, the type of service, identification, fragment offset, or a combination thereof.

Also for example, the message auxiliary module 510 can identify the relevant sequence 308 based on a difference in reception time between the multiple instances of the packet 202. As a more specific example, the message auxiliary module 510 can identify the relevant sequence 308 as the group of the packet 202 arriving within the relevant time 310 of FIG. 3 from a triggering event, such as initiating a process or receiving a triggering data in the message portion 206. Also as a more specific example, the message auxiliary module 510 can identify the relevant sequence 308 based on a subsequent instance of the packet 202 being received within the relevant time 310 from a preceding instance of the packet 202.

Also for example, the message auxiliary module 510 can identify the relevant sequence 308 based on the message portion 206. The message auxiliary module 510 can use the message format 210 of FIG. 2 to analyze or compare process, application, thread, or a combination thereof intended to receive or utilize the received instance of the packet 202. The message auxiliary module 510 can identify the relevant sequence 308 as the instances of the packet 202 intended for common or sequential instances of the process, the application, the thread, or a combination thereof.

Also for example, the message auxiliary module 510 can identify the relevant sequence 308 based on the contextual input 316. The message auxiliary module 510 can identify the relevant sequence 308 as the instances of the packet 202 including common or associated instances of the contextual input 316, as predetermined by the navigation system 100.

The message auxiliary module 510 can analyze one instance of the packet 202. The message auxiliary module 510 can analyze preceding or following instances of the packet 202 based on the conditions or requirements described above. The message auxiliary module 510 can determine the packet 202 satisfying the above described conditions or requirements as the relevant message associated with the analyzed instance of the packet 202. The message auxiliary module 510 can determine the relevant sequence 308 to include the analyzed instance of the packet 202 and the relevant message.

The message auxiliary module 510 can determine the reliability status 314 for the packet 202, the relevant sequence 308, or a combination thereof. The message auxiliary module 510 can determine the reliability status 314 for the packet 202 based on the checksum information of the header portion 204 therein.

The message auxiliary module 510 can further determine the reliability status 314 based on the message portion 206 including data predetermined by the navigation system 100. The message auxiliary module 510 can include predetermined data representing an error or falsehood regarding the location data 212 or the contextual input 316 associated with geographic location. For example, the message auxiliary module 510 can determine the reliability status 314 based on a repeat request, error status from the device sending the packet 202, a reroute request, a new request cancelling or overriding a previous request, a sequence of data preceding or following thereof, a timing thereof, or a combination thereof.

The content module 512 is for analyzing and processing the packet 202 based on the message portion 206. The content module 512 can identify the packet 202 as the location message 302 or the generic message 304. The content module 512 can identify based on analyzing the message portion 206. For example, the content module 512 can identify based on the location data 212, the contextual input 316, or a combination thereof.

The content module 512 can analyze and process the message portion 206 of the packet 202 based on the message format 210. The content module 512 can identify the packet 202 including the location data 212, the contextual input 316 indicating or associated with geographic location, or a combination thereof as the location message 302. The content module 512 can identify the packet 202 as the location message 302 based on a category of the data in the message portion 206, inclusion of the location data 212, other packets in the relevant sequence 308, or a combination thereof.

For example, the content module 512 can identify the packet 202 as the location message 302 when the message portion 206 is designated or intended for a navigation application or a search application, includes coordinates, includes a label or an address representing a geographic location, or a combination thereof based on the message format 210. As a more specific example, the content module 512 can analyze specific portion, timing, identifier, or a combination thereof within the message portion 206 designated by the message format 210 to include the intended application, content for coordinate information, content for key words such as "home" or specific mailing address, or a combination thereof.

Also for example, the content module 512 can identify the packet 202 as the location message 302 when the message portion 206 includes scheduling information. As a more specific example, the content module 512 can identify the packet 202 associated with a calendar application or a messaging application and further indicating a meeting location and a meeting time. The content module 512 can log the meeting location and the meeting time for processing with the further instance of the packet 202 received at the meeting time.

Also for example, the content module 512 can identify the location message 302 based on preceding or following instances of the packet 202. As a more specific example, the intended application or a communication protocol can require a specific order in communicating the location data 212 between devices. The content module 512 can include predetermined methods or processes for recognizing a trigger for the specific order and further recognize the location message 302 based on the specific order.

The content module 512 can further be implemented in parallel to applications, operating systems, a hardware portion within a device, or a combination thereof and categorize the location message 302 while processing the packet 202 as intended. For example, the content module 512 can be a cataloging routine or a recording circuit executing simultaneously with a navigation application or firmware. The content module 512 can identify the location message 302 while the packet 202 is being processed by the application or the hardware as intended by the communication.

The content module 512 can identify the packet 202 as the generic message 304 when it is not identified as the location message 302. The navigation system 100 can further use the generic message 304 to identify or associate a geographic location with the internet address 208. Details regarding the use of the generic message 304 will be described below.

It has been discovered that the location message 302 based on the packet 202 indicating the geographic location at a future time provides increased accuracy for locating devices based on the internet address 208. The navigation system 100 can use scheduling information including location associated with a previously-occurring or a latter-occurring time and the packet 202 arriving at the corresponding previous or latter time to associate the internet address 208 and a geographic location. The scheduling information can provide detailed address or label for a location and further utilize data received at different times to enrich the location analysis.

The content module 512 can further identify a travel route 513. The content module 512 can identify the travel route 513 as a path designated for the user utilizing the sending device to traverse to a destination. The content module 512 can identify the travel route 513 based on the message portion 206 as described above.

The travel route 513 can include a record of a route traveled by the device, a calculated route for traversing to a destination, or a combination thereof. The travel route 513 can include a current route being traveled by the user, a route previously traversed by the user, scheduled or likely to be traversed by the user at a future time. The travel route 513 can be associated with the relevant sequence 308, a future location, a user schedule, user habit, such as work hours or travel patterns, or a combination thereof.

The content module 512 can further identify an association between the travel route 513 and the relevant sequence 308 based on receiving one or more instance of the packet 202 for the relevant sequence 308 while traversing the travel route 513. The navigation system 100 can use the travel route 513 to identify geographic locations for the internet address 208. Details regarding the usage of the travel route 513 will be described below.

It has been discovered that the travel route 513 associated with the relevant sequence 308 provides increased accuracy in locating the user based on the internet address 208. The travel route 513 can provide a geographic location for the device sending the packet 202 independent of the location data 212 or other instances of the contextual input 316. The additional geographic association can improve accuracy of locating the internet address 208, which can then be used to locate the sending device.

The message identification module 502 can use the generic message 304, the location message 302, the message context 306, or a combination thereof to identify the training set 508. The message identification module 502 can identify the training set 508 to include the location message 302, the generic message 304 associated with the location message 302 based on the relevant sequence 308, or a combination thereof.

The message identification module 502 can further use the generic message 304, the location message 302, or a combination thereof to identify the training set 508 based on the relevant sequence 308 including only affirmative or valid instances of the reliability status 314. The message identification module 502 can exclude the generic message 304, the location message 302, or a combination thereof from the training set 508 for the relevant sequence 308 including the reliability status 314 representing an error, a repeat, a deviation from route, data accuracy estimate below a predetermined threshold, or a combination thereof.

The message identification module 502 can identify the training set 508 by logging the packet 202 or information therein. For example, the message identification module 502 can store the internet address 208, reception time, the location data 212, the contextual input 316, the relevant sequence 308, the reliability status 314, or a combination thereof as the training set 508.

It has been discovered that the training set 508 including the generic message 304 based on the relevant sequence 308 provides increased accuracy. The generic message 304 based on the relevant sequence 308 can provide additional data points indicating location even without the location data 212 therein. The additional data points having connection to the location message 302 can increase the accuracy.

It has further been discovered that the training set 508 including the packet 202 based on the contextual input 316 describing a geographic location provides increased likelihood in locating the user based on the internet address 208. Recognizing and utilizing additional data indicating geographic location based on the contextual input 316 even without the location data 212 therein can broaden the scope of information and available data points to increase the accuracy.

The message identification module 502 can further identify the training set 508 specific to various factors. For example, the message identification module 502 can identify or group instances of the packet 202 based on user profile or identification, a device identification or categorization, a specific location or zone, or a combination thereof. Also for example, the message identification module 502 can process all instances of the packet 202 available to the navigation system 100.

It has been discovered that the training set 508 available to process all instances of the packet 202 and specific groupings of the packet 202 provide personalized locating and further increased accuracy for the locating process. The training set 508 representing all available instances of the packet 202 can provide comprehensive mapping and abundant number of samples for associating locations to the internet address 208. The training set 508 representing specific and personalized data set can provide user-relevant locating, such as through labels or contextual names, and further improve the location accuracy based on other contextual or profile information for the user.

The message identification module 502 can use the first communication unit 416 of FIG. 4, the second communication unit 436 of FIG. 4, the first control interface 422 of FIG. 4, the second control interface 444 of FIG. 4, or a combination thereof to communicate the packet 202. The message identification module 502 can use the first communication unit 416, the second communication unit 436, the first control unit 412 of FIG. 4, the second control unit 434 of FIG. 4, or a combination thereof to identify the training set 508, including processing the message context 306, the message portion 206, the header portion 204, or a combination thereof. The message identification module 502 can store the training set 508, the packet 202, any processing results described above, or a combination thereof in the first storage unit 414 of FIG. 4, the second storage unit of FIG. 4, or a combination thereof.

After identifying the training set 508, the control flow can pass from the message identification module 502 to the modeling module 504, the subsequent processing module 506, or a combination thereof. The control flow can pass by having a processing result, such as the training set 508 or the packet 202, as an output from the message identification module 502 to an input of the modeling module 504, the subsequent processing module 506, or a combination thereof. The control flow can further pass by storing the processing result at a location known and accessible to the modeling module 504, the subsequent processing module 506, or a combination thereof. The control flow can further pass by notifying the modeling module 504, the subsequent processing module 506, or a combination thereof, such as by using a flag, an interrupt, a status signal, or a combination thereof. The control flow can further pass using a combination of the processes described above.

The modeling module 504 is for generating the geographic profile 320 of FIG. 3 for locating a device transmitting the packet using the internet address 208 therein. The modeling module 504 can utilize a zoning mechanism 514. The zoning mechanism 514 is a method or a process for associating a geographic location or a geographic region with one or more instance of the internet address 208. The zoning mechanism 514 can calculate a spatial relationship between instances of the location data 212 relative to the internet address 208.

The zoning mechanism 514 can be predetermined by the navigation system 100 to process the training set 508. For example, the zoning mechanism 514 can include machine learning mechanism, pattern recognition mechanism, statistical analysis, spatial processing, or a combination thereof. Also for example, the zoning mechanism 514 can include a process or a method for correlating the contextual input 316 to a specific location or an area, an accuracy estimation for correlating the contextual input 316 to the specific location or the area, or a combination thereof.

The zoning mechanism 514 can be implemented using hardware circuitry, such as a processing unit or a dedicated circuitry, software, firmware, or a combination thereof. For example, the zoning mechanism 514 can be implemented using the control unit 412, the second control unit 434, the first communication unit 416, the second communication unit 436, an accelerator or a dedicated circuitry, or a combination thereof. Also for example, the zoning mechanism 514 can be stored and implemented with the first storage unit 414, the second storage unit 446, or a combination thereof.

The zoning mechanism 514 can include the method or the process for validating or adjusting the training set 508, calculating an area, calculating a confidence level of locating the device using the internet address 208, or a combination thereof. For example, the zoning mechanism 514 can include implementation steps or instructions, functions, routines thresholds, equations, categories, look-up tables, system addresses, or a combination thereof.

The modeling module 504 can use the zoning mechanism 514 to calculate a data-point accuracy 516. The data-point accuracy 516 can represent a level of precision in representing an association between a geographic location or area and an instance of the internet address 208. The data-point accuracy 516 can describe the level of precision for one or more instance of the packet 202 corresponding to the training set 508.

The modeling module 504 can use the zoning mechanism 514 to evaluate and adjust the training set 508 identified by the message identification module 502. For example, the modeling module 504 can use the zoning mechanism 514 to calculate the data-point accuracy 516 for each instance of the packet 202 included in or corresponding to the training set 508.

The modeling module 504 can use the zoning mechanism 514 implementing calculation of the data-point accuracy 516 based on a variety of factors. For example, the modeling module 504 can calculate the data-point accuracy 516 based on similarity to existing instances. The modeling module 504 can calculate a distance or a deviation of the packet 202 from a cluster based on rest of the data points in the training set 508.

Also for example, the modeling module 504 can calculate the data-point accuracy 516 based on known or measured signal quality or strength, error rate, tolerance level, locating methodology, or a combination thereof associated with the location data 212, the internet address 208, or a combination thereof. The navigation system 100 can receive an indication of signal quality or locating methodology from the transmitting device or the communication portal 108 of FIG. 1. The navigation system 100 can further include a map or a table describing signal quality for various geographic regions.

Also for example, the modeling module 504 can calculate the data-point accuracy 516 based on a quality representation or a categorization of the contextual input 316. The zoning mechanism 514 can include categories and corresponding reliability values for the contextual input 316 based on intended application, a function or a feature therein, or a combination thereof.

As a more specific example, the zoning mechanism 514 can include a reliability rating for a meeting location for a schedule calendar, a current location intended for a navigation application, a keyword indicating a location, or a combination of keywords providing contextual relevance to the locating keyword, or a combination thereof. The zoning mechanism 514 can further include an equation or a process for calculating the data-point accuracy 516 based on combining the various instances of the reliability rating.

The modeling module 504 can adjust or modify the training set 508 in a variety of ways. For example, the modeling module 504 can adjust or modify the training set 508 by storing the data-point accuracy 516 to a corresponding instance of the packet 202 for the training set 508. Also for example, the modeling module 504 can include a threshold predetermined by the navigation system 100 for evaluating the data-point accuracy 516. The modeling module 504 can adjust or modify the training set 508 to include the packet 202 satisfying the predetermined threshold and without the instances of the packet 202 deviating from the predetermined threshold.

The modeling module 504 can generate the geographic profile 320 based on the training set 508. The modeling module 504 can generate the geographic profile 320 based on the reliability status 314 by generating the geographic profile 320 using the training set 508 including the packet 202 based on the reliability status 314. The modeling module 504 can generate the geographic profile 320 based on the generic message 304, the travel route 513, or a combination thereof by generating the geographic profile 320 using the training set 508 including the generic message 304, the location message 302, the travel route 513, the location data 212, the message context 306, or a combination thereof.

The modeling module 504 can generate the geographic profile 320 by initially organizing or grouping the instances of the packet 202 in the training set 508. The modeling module 504 can generate the geographic profile 320 by grouping the instances of the packet 202 based on common value for the internet address 208.

The modeling module 504 can further organize or group the instances of the packet 202 using a machine-learning mechanism in processing the training set 508. The modeling module 504 calculate clusters, weights, distances, models, or a combination thereof based on the training set 508. The modeling module 504 can calculate the various results using or corresponding to the location data 212, the indicated location corresponding to the contextual input 316, the internet address 208, or a combination thereof.

The modeling module 504 can further determining the set detail 328 of FIG. 3. The modeling module 504 can determine the set detail 328 based on multiple instances of the packet 202 corresponding to the training set 508.

For example, the modeling module 504 can use equations or processes in the zoning mechanism 514 to identify a quantity of the packets in the training set 508, specific to a user or a device based on corresponding profile, specific to an instance of the internet address 208, specific to the message context 306 or the message portion 206, or a combination thereof as the sample size 330 of FIG. 3. Also for example, the modeling module 504 can use equations or processes in the zoning mechanism 514 to calculate extreme points within the training set 508 or a portion thereof, a distance between the extreme points, a correlation value, a deviation value, a range value, a density value, or a combination thereof as the sample range 332 of FIG. 3.

The modeling module 504 can generating the geographic profile 320 associated with the internet address 208 based on the message portion 206 for locating the first device 102 based on the internet address 208. The modeling module 504 can include a zoning module 518, an overlap module 520, a confidence module 522, a portal adjustment module 524, an estimation module 526, or a combination thereof. The modeling module 504 can implement the zoning mechanism 514 using the zoning module 518, the overlap module 520, the confidence module 522, the portal adjustment module 524, the estimation module 526, or a combination thereof.

The zoning module 518 is for associating geographical location or area with the internet address 208. The zoning module 518 can associate the geographical location or area with the internet address 208 by calculating the coverage zone 322 of FIG. 3 corresponding to the internet address 208. The zoning module 518 can calculate the coverage zone 322 based on the training set 508, the set detail 328, or a combination thereof for locating the user or the first device 102 representing the user based on the internet address 208 identifying the first device 102 transmitting the packet 202.

The zoning module 518 can calculate the coverage zone 322 based on the location message 302. The zoning module 518 can calculate the coverage zone 322 as the location data 212 in the location message 302. The zoning module 518 can further calculate an area, such as based on a predetermined radius, shape, granularity value, or a combination thereof encompassing the location or area represented by the location data 212 as the coverage zone 322.

The zoning module 518 can further calculate the coverage zone 322 based on multiple instances of the location message 302 corresponding to the internet address 208. The zoning module 518 can calculate the coverage zone 322 by mapping the instances of the location data 212 and connecting the outer or perimeter instances of the location data 212. The zoning module 518 can calculate the coverage zone 322 to include all instances of the location data 212 corresponding to each instance of the internet address 208.

The zoning module 518 can further calculate a density or a distribution corresponding to the mapped instances of the location data 212 for a corresponding instance of the internet address 208. The zoning module 518 can calculate the coverage zone 322 based on a statistical distribution or a density requirement based on the multiple instances of the location data 212. The zoning module 518 can use the geographical mapping of the location data 212, the set detail 328, or a combination thereof to calculate the density or the distribution and the coverage zone 322.

Similarly, the zoning module 518 can calculate or adjust the sample range 332 to include a physical distance based on the instances of the packet 202 in the training set 508. For example, the zoning module 518 can calculate a distance between instances of the location data 212, distance across the coverage zone 322, a radius and a calculated center for the coverage zone 322, or a combination thereof.

The zoning module 518 can also calculate the coverage zone 322 including multiple areas. For example, the zoning module 518 can calculate the coverage zone 322 to include multiple concentric or overlapping regions for each internet address 208. As a more specific example, the zoning module 518 can use the zoning mechanism 514 to calculate the coverage zone 322 as multiple concentric areas with different radius or size. Also as a more specific example, the zoning module 518 can use the zoning mechanism 514 to calculate the coverage zone 322 using existing boundaries, such as rooms, buildings, walls, property lines, city block, natural geographical formations, or a combination thereof.

The zoning module 518 can also calculate the coverage zone 322 as a function based on a distance from an established location. The zoning module 518 can use the zoning mechanism 514 to calculate a cluster center for the cluster representing the instances of the location data 212 for the internet address 208 in the training set 508. The zoning module 518 can further generate an equation representing a likelihood of accuracy based on a distance away from the cluster center.

The zoning module 518 can further calculate the coverage zone 322 based on the user profile or the device profile. For example, the zoning module 518 can use a tolerance level or a performance measure associated with the first device 102 in processing the location data 212 to calculate the coverage zone 322. Also for example, the zoning module 518 can use user's information, such as contacts, home address, employer identification, habits, patterns, preferences, detailed geographical information associated thereto, or a combination thereof to calculate the coverage zone 322.

The zoning module 518 can process multiple instances of the coverage zone 322 based on the geographic location. The zoning module 518 can map the multiple instances of the coverage zone 322 each corresponding to the internet address 208. The zoning module 518 can analyze the mapping to generate the geographic profile 320.

For example, the zoning module 518 can use sequence of the internet addresses associated with the relevant sequence 308 to determine relative locations or adjacency of corresponding instances of the coverage zone 322. Also for example, the zoning module 518 can use the travel route 513 and the sequence of the internet addresses associated with the travel route 513 and the corresponding relevant sequence 308 to determine the relative locations or the adjacency for the instances of the coverage zone 322.

The overlap module 520 is for determining the address range 326 of FIG. 3 for the geographic profile 320. The overlap module 520 can determine the address range 326 as the instances of the internet address 208 corresponding to a common geographic location or area. The overlap module 520 can use the mapping of the coverage zone 322 from the zoning module 518. The overlap module 520 can determine the address range 326 for representing possible values for the internet address 208 accessible or assignable to the communication portal 108, such as for dynamic IP addresses.

The overlap module 520 can determine overlapping instances of the coverage zone 322 or regions therein. The overlap module 520 can include a threshold, a shape, or a combination thereof for recognizing significant amount of overlap for the address range 326 as predetermined by the navigation system 100. The overlap module 520 can group the corresponding instances of the internet address 208 based on the commonalities in the geographic location or region to determine the address range 326.

The overlap module 520 can further fill in different possible permutations of the internet address 208 based on address protocols or conventions. For example, the overlap module 520 can determine the address range 326 based on extreme instances, such as highest or minimum value, of the internet address 208 and all possible values for the internet address 208 there-between according to standards, schemes, methodology, or a combination thereof regarding assignment of the internet address 208 with the communication portal 108.

The confidence module 522 is for calculating the confidence level 324 of FIG. 3 corresponding to the coverage zone 322. The confidence module 522 can calculate the confidence level 324 using the zoning mechanism 514. The confidence module 522 can further calculate the confidence level 324 based on the set detail 328. The confidence module 522 can use equations, processes, methods, functions, routines, or a combination thereof predetermined by the navigation system 100 to calculate the confidence level 324.

The confidence module 522 can calculate the confidence level 324 for a given instance of the internet address 208. For example, the confidence module 522 can calculate the confidence level 324 for each concentric or overlapping instances of the coverage zone 322 corresponding to the internet address 208 as described above for the zoning module 518. Also for example, the confidence module 522 can calculate the confidence level 324 as the result of the equation representing the likelihood of accuracy based on a distance away from the cluster center as described above.

The confidence module 522 and the zoning module 518 can iteratively adjust the coverage zone 322 based on the confidence level 324. For example, the confidence module 522 and the zoning module 518 can adjust the coverage zone 322 satisfying a predetermined threshold for the confidence level 324, such as a set value or values of likelihood that the device is located within the coverage zone 322.

The portal adjustment module 524 is for processing the coverage zone 322 using the portal location 318 of FIG. 3. The portal adjustment module 524 can identify the portal location 318 for representing the location data 212 locating the communication portal 108. The portal adjustment module 524 can access available data regarding geographic location of the communication portal 108. For example, the portal adjustment module 524 can search or access available data bases for cell tower or router locations, ownership or registration information including address for the communication portal 108 or the structure housing the communication portal 108, or a combination thereof.

The portal adjustment module 524 can generate the geographic profile 320 based on the portal location 318. The portal adjustment module 524 can generate the geographic profile 320 by associating the coverage zone 322, the confidence level 324, the address rage 316, or a combination thereof to the instance of the communication portal 108 with the portal location 318 located within the corresponding instance of the coverage zone 322.

The portal adjustment module 524 can further adjust the coverage zone 322 relative to the portal location 318 therein. For example, the grouping of the location data 212 for determining the coverage zone 322 can be based on identifying clusters around or near the portal location 318. Also for example, the confidence level 324 can be calculated or adjusted relative to distances or densities surrounding the portal location 318. Also for example, the portal adjustment module 524 can adjust the coverage zone 322 based on known capabilities, limitations, surroundings, or a combination thereof for the communication portal 108 at the portal location 318.

The portal adjustment module 524 can further estimate the portal location 318 based on the coverage zone 322. The portal adjustment module 524 can identify a location at a center portion of the coverage zone 322, densest location of the coverage zone 322, or a combination thereof as the portal location 318 when the portal location 318 is not available external to the training set 508.

The modeling module 504 can generate the geographic profile 320 by combining the processing results described above. For example, the modeling module 504 can use the individual instances of the coverage zone 322, adjacency or proximate relationships thereof, or a combination thereof to adjust the locations, shapes, groupings, or a combination thereof for the coverage zone 322.

Also for example, the modeling module 504 can combine the instances of the packet 202 corresponding to overlapping instances of the coverage zone 322 to calculate a combined instance of the coverage zone 322 and the confidence level 324, the address range 326, or a combination thereof corresponding thereto. Also for example, the modeling module 504 can determine the set detail 328 specific for each instance of the coverage zone 322. Also for example, the modeling module 504 can iteratively utilize the above described sub-modules to adjust the coverage zone 322 to generate the geographic profile 320.

The estimation module 526 is for locating the first device 102 based on the internet address 208. The estimation module 526 can locate the first device 102 by identifying specific instance of the geographic profile 320 or the coverage zone 322 therein. The estimation module 526 can further locate the first device 102 by calculating the location estimate 334 of FIG. 3.

The estimation module 526 can identify the geographic profile 320 corresponding to the user or the device based on appropriate profile information. The estimation module 526 can further identify the geographic profile 320 having association or relevance to current context of the user or the device, such as for personal context or based on current location and time. The estimation module 526 can identify the geographic profile 320 including previously received instances of the contextual input 316 matching or relating to current known contextual factors regarding the user or the first device 102.

The estimation module 526 can further identify the coverage zone 322 by identifying the instance of the coverage zone 322 having highest instance of the confidence level 324 specific for an instance of the internet address 208, corresponding to the user or the device, corresponding to the current context, or a combination thereof. The estimation module 526 can further identify the coverage zone 322 corresponding to the internet address 208 of a received instance of the packet 202.

The estimation module 526 can further calculate the location estimate 334 based on the geographic profile 320. The estimation module 526 can calculate a location within the coverage zone 322 based on various factors. For example, the estimation module 526 can calculate the location estimate 334 as the most frequently occurring instance of the location data 212 corresponding to the internet address 208. Also for example, the estimation module 526 can calculate the location estimate 334 specific for a user or a device, based on matching a pattern of behavior, similar contexts, or a combination thereof.

The estimation module 526 can further calculate a confidence value associated with the location estimate 334. The estimation module 526 can calculate the confidence value based on repeatability of the pattern, available data, frequency, or a combination thereof.

The modeling module 504 can evaluate the geographic profile 320 based on the profile threshold 336 of FIG. 3. The modeling module 504 can indicate a validity for an instance of the coverage zone 322 corresponding to the internet address 208 satisfying the profile threshold 336. The modeling module 504 can compare the confidence level 324 to the profile threshold 336 to evaluate the geographic profile 320.

The navigation system 100 can initiate other processes or utilize the geographic profile 320 in other processes when the geographic profile 320 satisfies the profile threshold 336. For example, the modeling module 504 can implement the estimation module 526 based on validated instances of the geographic profile 320. Also for example, the modeling module 504 can use the geographic profile 320 or the location estimate 334 to validate subsequently received instances of the location data 212 or processes regarding contexts.

It has been discovered that the geographic profile 320 representing an association between geographical location or area and the internet address 208 provides increased functionalities. The geographic profile 320 can locate the user or the first device 102 using the internet address 208, independent of the content in the message portion 206. The locating feature can provide location-specific features for the navigation system 100 independent of the location data 212, which can further improve battery life of the first device 102.

It has further been discovered that the geographic profile 320 including the address range 326 can provide versatility in locating the device. The address range 326 can account for dynamic addresses available for a given instance of the communication portal 108. The address range 326 can further simplify the processing power by forming a combined instance of the coverage zone 322 reducing the number of independent instances of the geographic profile 320.

It has further been discovered that the geographic profile 320 including the coverage zone 322 and corresponding instance of the confidence level 324 based on the training set 508 including the location message 302 provides increased accuracy in locating mobile devices without using the location data 212. The verified and reliable location data from the location message 302 sourced by mobile devices can characterize coverage areas using real data instead of models or estimates. Moreover, the use of the location data 212 from mobile devices coupled to the communication portal 108 can provide accurate locations improving on available static data regarding the communication portal 108.

The modeling module 504 can use the first control unit 412, the second control unit 434, or a combination thereof to process the training set 508 and generate the geographic profile 320. The modeling module 504 can store the geographic profile 320 in the first storage unit 414, the second storage unit 446, or a combination thereof.

After generating the geographic profile 320, the control flow can pass from the modeling module 504 to the subsequent processing module 506. The control flow can pass similarly as described above between the message identification module 502 and the modeling module 504, but using processing results of the modeling module 504, such as the geographic profile 320 or the location estimate 334.

The subsequent processing module 506 is for utilizing validated instances of the geographic profile 320. The subsequent processing module 506 can include an internal module 528, an external module 530, or a combination thereof. The subsequent processing module 506 can implement the location-specific process 338 of FIG. 3 based on validated instances of the geographic profile 320.

The internal module 528 is for processing received instances of the packet 202. The internal module 528 can be implemented when the navigation system 100 receives an instance of the packet 202. The navigation system 100 can process the packet 202 as described above. The internal module 528 can further invoke the estimation module 526 to generate the geographic profile 320, calculate the location estimate 334, or a combination thereof specifically corresponding to the internet address 208 of the received packet. The invocation can be contemporaneous to receiving the packet 202.

The internal module 528 can use the geographic profile 320, the location estimate 334, or a combination thereof to verify the processes directly associated with the received packet. For example, the internal module 528 can use the location error-check mechanism 342 of FIG. 3 to verify any location information, such as the location data 212 or the contextual input 316 in the received packet, using the geographic profile 320, the location estimate 334, or a combination thereof.

The internal module 528 can use validated instances of the geographic profile 320, the location estimate 334, or a combination thereof to determine errors in incoming instances of the packet 202. The internal module 528 can further generate and communicate the reliability status 314 based on comparing the location data 212, contextual input 316, or a combination thereof for the incoming instance of the packet 202 to the validated instance of the geographic profile 320, the location estimate 334, or a combination thereof associated with the internet address 208 of the incoming instance of the packet 202.

It has been discovered that the geographic profile 320 and the location error-check mechanism 342 can reduce error rates and increase processing efficiencies for the navigation system 100. The navigation system 100 can use the geographic profile 320 as additional check parameter to evaluate an accuracy of the received data, reducing the likelihood of processing false or erroneous input.

The external module 530 is for providing features in addition to addressing the received instances of the packet 202. The external module 530 can be implemented as an additional feature or result in response to receiving the packet 202, and in addition to directly addressing or processing the packet 202.

The external module 530 can generate and communicate the location-specific content 340 of FIG. 3 in response to receiving the generic message 304 without the location data 212. The external module 530 can generate and communicate the location-specific content 340 based on the geographic profile 320 associated with the internet address 208 of the received packet 202.

For example, the external module 530 can identify and send reminders, notes, messages, or a combination thereof relevant to the user's current location as indicated by the internet address 208. Also for example, the external module 530 can compare the coverage zone 322 corresponding to the internet address 208 of the generic message 304 to advertisements associated with locations or areas within the coverage zone 322. The external module 530 can identify and send the corresponding advertisements to the user. Also for example, the external module 530 can utilize "check-in" type of features for establishments, instant messaging features between users, recognizing near-by friends, or a combination thereof without specifying the location data 212.

It has been discovered that the location-specific content 340 and the geographic profile 320 provides increased functionalities for the user. The geographic profile 320 can be used to locate the user and provide the location-specific content 340 for applications, features, conditions, devices, or a combination thereof lacking the ability to provide the location data 212.

The modules described in this application can be hardware implementation or hardware accelerators, including passive circuitry, active circuitry, or both, in the first storage unit 414, the second storage unit 446, the first control unit 416, the second control unit 438, or a combination thereof. The modules can also be hardware implementation or hardware accelerators, including passive circuitry, active circuitry, or both, within the first device 102, the second device 106 of FIG. 1, or a combination thereof but outside of the first storage unit 414, the second storage unit 446, the first control unit 416, the second control unit 438, or a combination thereof.

The navigation system 100 has been described with module functions or order as an example. The navigation system 100 can partition the modules differently or order the modules differently. For example, the portal adjustment module 524 can determine the portal location 318 from externally verified data before calculating the coverage zone 322 with the zoning module 518. Also for example, the navigation system 100 can implement the message identification module 502, the modeling module 504, the subsequent processing module 506, or a combination thereof in parallel, in series, or a combination of configurations thereof relative to each other.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, or a combination thereof can represent the non-transitory computer readable medium. The first storage unit 414, the second storage unit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the geographic profile 320 results in the movement in the physical world, such as content displayed or recreated for the user on one or more of the devices or physical displacement of the user carrying the first device 102. Movement in the physical world results in updates to the location data 212, the contextual input 316, the training set 508, other nearby instances of the internet address 208 or a combination thereof, which can be fed back into the navigation system 100 and further influence the geographic profile 320.

Figure 6:
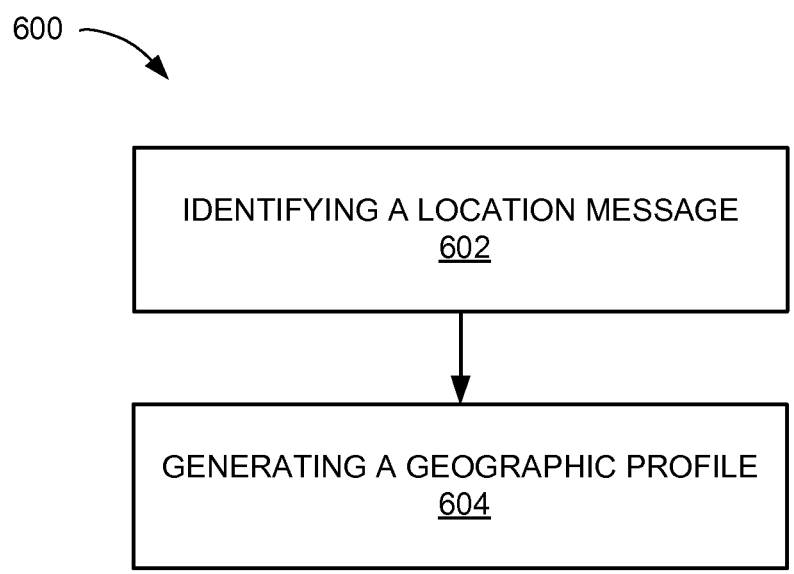
FIG. 6 is a flow chart of a method of operation of a navigation system in an embodiment of the present invention.

Referring now to FIG. 6, therein is shown a flow chart of a method 600 of operation of a navigation system 100 in an embodiment of the present invention. The method 600 includes: identifying a location message including an internet address and a message portion in a block 602; and generating with a control unit a geographic profile associated with the internet address based on the message portion for locating a device based on the internet address in a block 604.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    identifying a location message including an internet address and a message portion;
    determining a geographic location based on location data in the message portion, the geographic location for locating a device sourcing the location message;
    generating with a control unit a geographic profile associated with the internet address by calculating a spatial relationship between the location data relative to the internet address, based on the geographic location associated with the message portion, the geographic profile for describing a relationship between the geographic locations and the internet address,
    receiving a generic message corresponding to the internet address and without a location data in the message portion; and
    generating a location-specific content without the location data based on the geographic profile associated with the internet address for communicating to the device.

2. The method as claimed in claim 1 further comprising:
    determining a set detail based on multiple instances of the location message; and
wherein:
    generating the geographic profile includes calculating a coverage zone and a confidence level corresponding to the coverage zone based on the set detail for locating the device based on the internet address.

3. The method as claimed in claim 1 further comprising:
    identifying a portal location for locating a communication portal; and
wherein:
    generating the geographic profile includes generating the geographic profile based on the portal location.

4. The method as claimed in claim 1 further comprising:
    identifying a relevant sequence including a generic message and the location message; and
wherein:
    generating the geographic profile includes generating the geographic profile based on the generic message in the relevant sequence.

5. The method as claimed in claim 1 further comprising:
    identifying a relevant sequence including a generic message and the location message;
    identifying a travel route associated with the relevant sequence; and
wherein:
    generating the geographic profile includes generating the geographic profile based on the generic message and the travel route.

6. The method as claimed in claim 1 further comprising:
    determining a reliability status for a relevant sequence including the location message; and
wherein:
    generating the geographic profile includes generating the geographic profile based on the reliability status.

7. The method as claimed in claim 1 wherein generating the geographic profile includes determining an address range for the geographic profile including multiple separate instances of the internet address for representing a communication portal.

8. The method as claimed in claim 1 further comprising:
    receiving a generic message corresponding to the internet address and including a location data in the message portion; and
    generating a reliability status based on comparing the location data to the geographic profile associated with the internet address.

9. The method as claimed in claim 1 further comprising:
    receiving a generic message corresponding to the internet address;
    identifying the geographic profile associated with the internet address; and
    calculating a location estimate based on the geographic profile for locating the device based on the internet address.

10. A navigation system comprising:
a communication unit including microelectronics configured to communicate a location message;
a control unit including at least a processor, coupled to the communication unit, configured to:
identify a location message including an internet address and a message portion,
determine a geographic location based on location data in the message portion, the geographic location for locating a device sourcing the location message,
generate a geographic profile associated with the internet address by calculating a spatial relationship between the location data relative to the internet address, the geographic profile for describing a relationship between the geographic location and internet address,
receiving a generic message corresponding to the internet address and without a location data in the message portion; and
generating a location-specific content without the location data based on the geographic profile associated with the internet address for communicating to the device.

11. The system as claimed in claim 10 wherein the control unit is configured to:
determine a set detail based on multiple instances of the location message; and
calculate a coverage zone and a confidence level corresponding to the coverage zone based on the set detail for locating the device based on the internet address.

12. The system as claimed in claim 10 wherein the control unit is configured to:
identify a portal location for locating a communication portal; and
generate the geographic profile based on the portal location.

13. The system as claimed in claim 10 wherein the control unit is configured to:
identify a relevant sequence including a generic message and the location message; and
generate the geographic profile based on the generic message in the relevant sequence.

14. The system as claimed in claim 10 wherein the control unit is configured to:
identify a relevant sequence including a generic message and the location message;
identify a travel route associated with the relevant sequence; and
generate the geographic profile includes generating the geographic profile based on the generic message and the travel route.

15. A non-transitory computer readable medium including instructions for a navigation system comprising:
identifying a location message including an internet address and a message portion;
determining a geographic location based on location data in the message portion, the geographic location for locating a device sourcing the location message;
generating with a control unit a geographic profile associated with the internet address by calculating a spatial relationship between the location data relative to the internet address, the geographic profile for describing a relationship between the geographic location and the internet address;
receiving a generic message corresponding to the internet address and without a location data in the message portion; and
generating a location-specific content without the location data based on the geographic profile associated with the internet address for communicating to the device.

16. The non-transitory computer readable medium as claimed in claim 15 further comprising:
determining a set detail based on multiple instances of the location message; and
wherein:
generating the geographic profile includes calculating a coverage zone and a confidence level corresponding to the coverage zone based on the set detail for locating the device based on the internet address.

17. The non-transitory computer readable medium as claimed in claim 15 further comprising:
identifying a portal location for locating a communication portal; and
generating the geographic profile based on the portal location.

18. The non-transitory computer readable medium as claimed in claim 15 further comprising:
identifying a relevant sequence including a generic message and the location message; and
wherein:
generating the geographic profile includes generating the geographic profile based on the generic message in the relevant sequence.

19. The non-transitory computer readable medium as claimed in claim 15 further comprising:
identifying a relevant sequence including a generic message and the location message;
identifying a travel route associated with the relevant sequence; and
wherein:
generating the geographic profile includes generating the geographic profile based on the generic message and the travel route.

* * * * *